(No Model.)

H. W. STEINER.
LAWN RAKE.

No. 395,721. Patented Jan. 8, 1889.

Witnesses,
Geo. Y. Thorpe
E. L. Biggins

Inventor,
H. W. Steiner.
By H. L. S. Attorneys,
C. A. Knowles

UNITED STATES PATENT OFFICE.

HENRY W. STEINER, OF EASTON, PENNSYLVANIA, ASSIGNOR OF ONE-HALF TO EDWARD W. MILLER, OF SAME PLACE.

LAWN-RAKE.

SPECIFICATION forming part of Letters Patent No. 395,721, dated January 8, 1889.

Application filed September 25, 1888. Serial No. 286,362. (No model.)

*To all whom it may concern:*

Be it known that I, HENRY W. STEINER, a citizen of the United States, residing at Easton, in the county of Northampton and State of Pennsylvania, have invented a new and useful Improvement in Lawn-Rakes, of which the following is a specification.

The invention relates to improvements in lawn-rakes, the object being to provide a rake having its head, teeth, shank, and braces made of a single piece of heavy spring-wire, with the teeth or projections so formed that they will not enter the ground and tear up the roots of grass; and it consists in the construction and novel combination of parts hereinafter described, illustrated in the accompanying drawings, and pointed out in the claims hereto appended.

Figure 1:
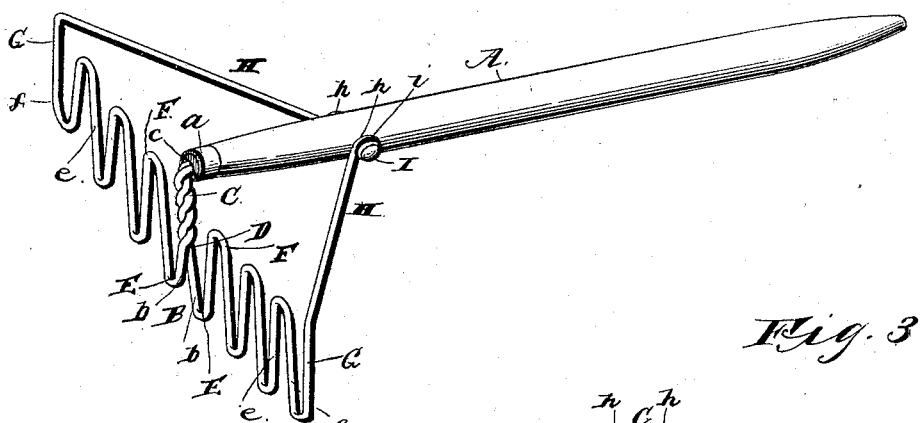
Figure 3:
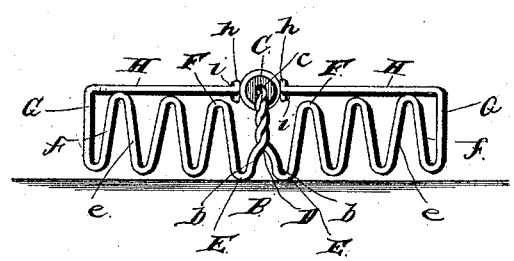
Figure 2:
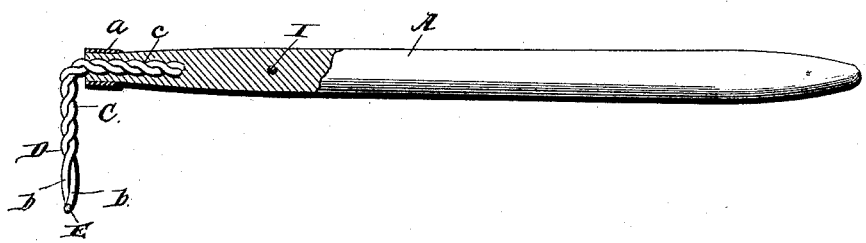

Figure 1 of the drawings represents a perspective view of a rake embodying the invention. Fig. 2 represents a central horizontal section through the rake-handle. Fig. 3 represents a front elevation.

Referring to the drawings by letter, A designates a handle, preferably of wood, having the ferrule $a$ on its outer end, as shown.

B is a piece of heavy spring-wire, of which the rake head, teeth, shank, and braces consist, all being integral. The said wire is twisted upon itself centrally for a suitable distance to form a screw-shank, C, that is engaged by turning, in the usual way, in the longitudinal opening $c$ in the handle. The said shank more than fills the opening $c$ and is bent vertically downward therefrom for a sufficient distance to a point, D, the strands $b$ of wire then being separated and carried outward in opposite directions. The strand on each side is carried downward from D a short distance and then bent upward in a regular curve, E, on the arc of a circle, from which it inclines upward and outward to a point about as high as the axis of the rake-handle, where it is bent downward in a curve, F, similar to the curve E, but in the reverse direction. From the curve F the wire inclines downward and outward to a curve similar in all respects to the curve E and ascends upward and outward therefrom, as from said curve E to a curve similar to the curve F. These reflex bends are continued far enough outward to form one-half of the rake-head, the wire strand $b$ having any desired number of curves E and F and of upward and outward and downward and outward extending portions $e$ $f$, respectively.

At the outer end of the rake-head the strand is bent vertically upward at G to a point slightly above the adjacent curve, F, and is then bent rearward and inward to the handle, forming an inclined brace, H, which has the loop $h$ on its end laid against the handle. A rivet, I, is then passed through the handle and both loops $h$, washers $i$ being placed between said loops and the upset ends of the rivet. The head, teeth, shank, and braces of the rake are thus all integral, the lower curves, E, and the adjacent portions $e f$ together forming the teeth, while the whole vertical portion of the wire may be considered the rake-head, which may, if desired, be so formed as to be convex on its lower edge or on a line touching the curves E. The bent-down portion $c'$ of the screw-shank forms a strong brace at the center of the head—a point which it is most necessary to brace strongly. The rounded ends E of the teeth or projections prevent the rake from entering the ground and digging up or breaking the roots of the grass, whereas if the parts $e$ $f$ were bent against each other they would differ in no respect, except that they were of bent wire, from ordinary rake-teeth. The reflexly-bent form of the rake-head gives it more strength than if the teeth were of portions of wire bent against each other.

By reference to Fig. 3 of the drawings it will be seen that the lower ends of the reflex bends are not on the same plane. On the contrary, the bends curve upward gradually on each side of the central brace, the latter first touching the ground. This curvature of the lower ends of the rake-teeth is of decided advantage.

Having described my invention, I claim—

1. A rake having its head, teeth, shank, and braces all formed of wire, the said wire being twisted centrally to form a screw-shank, C, a portion of which is engaged in the rake-handle, while a portion outside of the handle is bent downward to form a strong central brace for the rake-head, the strands of wire separating at the point D and carried outward in opposite directions on each side, bent downward from D a short distance, then bent upward in a curve, E, then inclined upward and outward, then downward in a curve, F, these reflex bends being continued far enough on each side to form one-half of the rake-head, the ends of the wire at each end of the rake-head being extended inward to form inclined braces H, which are secured to the rake-handle, as set forth.

2. A rake-head made of wire and composed of a series of reflex bends, the said bends having their lower ends arranged in a line which is curved upward on each side of the center of the rake-head, whereby the center of the rake-head first touches the ground, as set forth.

3. In a rake, a head composed of wire bent centrally upon itself to form a screw-shank, a portion of which twisted shank is engaged in the handle, while a portion outside therefrom is bent downward to form a strong central brace for the rake-head, and a series of reflex bends in the wire on each side of the central brace, said bends forming the teeth of the rake, substantially as specified.

4. The herein-described rake, composed of the handle A and the heavy spring-wire B, bent centrally to form the screw-shank C, having the downwardly-bent portion $c'$ outside the handle and bent reflexly outward on each side to form the curves E F and inclined arms or portions $e\ f$, and with its end portions bent toward the handle to form inclined braces H, having the loops $h$ and secured to the handle by the rivet I, substantially as specified.

In testimony that I claim the foregoing as my own I have hereto affixed my signature in presence of two witnesses.

HENRY W. STEINER.

Witnesses:
 JNO. STOTZER,
 T. H. BECKER.